(12) United States Patent
Latypov (10) Patent No.: US 8,856,698 B1
(45) Date of Patent: Oct. 7, 2014

(54) METHOD AND APPARATUS FOR PROVIDING METRIC RELATING TWO OR MORE PROCESS PARAMETERS TO YIELD

(71) Applicant: GLOBALFOUNDRIES Inc., Grand Cayman (KY)

(72) Inventor: Azat Latypov, San Jose, CA (US)

(73) Assignee: GlobalFoundries Inc., Grand Cayman (KY)

( * ) Notice: Subject to any disclaimer, the term of this patent is extended or adjusted under 35 U.S.C. 154(b) by 0 days.

(21) Appl. No.: 13/833,104

(22) Filed: Mar. 15, 2013

(51) Int. Cl.
*G06F 17/50* (2006.01)

(52) U.S. Cl.
CPC .................. *G06F 17/5068* (2013.01)
USPC .................. 716/56; 716/53; 716/54

(58) Field of Classification Search
USPC ................. 716/53–54, 56
See application file for complete search history.

(56) References Cited

U.S. PATENT DOCUMENTS

| | | | | | |
|---|---|---|---|---|---|
| 4,833,633 | A | * | 5/1989 | Morris | 708/250 |
| 5,724,487 | A | * | 3/1998 | Streit | 706/25 |
| 6,647,309 | B1 | * | 11/2003 | Bone | 700/121 |
| 6,777,147 | B1 | * | 8/2004 | Fonseca et al. | 430/30 |
| 6,927,005 | B2 | * | 8/2005 | Liebmann et al. | 430/5 |
| 7,096,074 | B2 | * | 8/2006 | Yulevitch et al. | 700/21 |
| 7,293,248 | B2 | * | 11/2007 | Chang et al. | 716/108 |
| 7,487,486 | B2 | * | 2/2009 | Celik et al. | 716/134 |
| 7,670,731 | B2 | * | 3/2010 | Finders et al. | 430/30 |
| 7,697,752 | B2 | * | 4/2010 | Li et al. | 382/159 |
| 7,921,383 | B1 | * | 4/2011 | Wei | 716/54 |
| 7,941,768 | B1 | * | 5/2011 | Wei | 716/54 |
| 8,020,120 | B2 | * | 9/2011 | Heng et al. | 716/52 |
| 8,515,150 | B2 | * | 8/2013 | Mangoubi et al. | 382/133 |
| 2006/0206851 | A1 | * | 9/2006 | Van Wingerden et al. | 716/19 |
| 2010/0162197 | A1 | * | 6/2010 | Ye et al. | 716/21 |
| 2012/0117522 | A1 | * | 5/2012 | Feng et al. | 716/54 |
| 2012/0123748 | A1 | * | 5/2012 | Aben et al. | 703/2 |

OTHER PUBLICATIONS

Chris Mack, "Fundamental Principles of Optical Lithography: The Science of Microfabrication," John Wiley & Sons, Ltd., 8 pgs, 2007.
Chris A. Mack, "Depth of Focus," The Lithography Tutor, Microlithography World, Spring 1995, pp. 20-21.
Chris A. Mack, "Depth of Focus, Part 2," The Lithography Tutor, Microlithography World, Autumn 1995, pp. 23-24.

* cited by examiner

*Primary Examiner* — Naum Levin
(74) *Attorney, Agent, or Firm* — Ditthavong & Steiner, P.C.

(57) ABSTRACT

A process and apparatus are provided for generating and evaluating one or more metrics for analyzing the design and manufacture of semiconductor devices. Embodiments include scanning a drawn semiconductor design layout to determine a difficult-to-manufacture pattern within the drawn semiconductor design layout based on a match with a pre-characterized difficult-to-manufacture pattern determining a corrected pattern based on a pre-determined correlation between the corrected pattern and the pre-characterized difficult-to-manufacture pattern, and replacing the difficult-to-manufacture pattern with the corrected pattern within the drawn semiconductor design layout.

18 Claims, 6 Drawing Sheets

METHOD AND APPARATUS FOR PROVIDING METRIC RELATING TWO OR MORE PROCESS PARAMETERS TO YIELD

TECHNICAL FIELD

The present disclosure relates to the design and manufacture of semiconductor devices and particularly to evaluating yield with respect to designing and manufacturing semiconductor devices. The present disclosure is applicable to all technology nodes, including 20 nanometer (nm) technology nodes and beyond.

BACKGROUND

For designing and manufacturing semiconductor devices, it is desirable to relate process parameters to yield. However, there are currently no metrics that allow for a direct comparison between process parameters and yield. Currently used metrics require inscribing an ellipse into a given process window, which is computationally expensive, requires iterations, and may result in multiple candidate solutions. It is desirable to develop metrics without such complicated calculations. Even further, it is desirable to develop metrics that relate maximizing yield to minimizing cost associated with the manufacture of semiconductor devices, such as cost associated with lithography process steps.

A need therefore exists for a method and apparatus for providing a metric that directly relates lithography process parameters to yield.

SUMMARY

An aspect of the present disclosure is generating and evaluating one or more metrics for analyzing the design and manufacture of semiconductor devices.

Another aspect of the present disclosure is a device for generating and evaluating one or more metrics for analyzing the design and manufacture of semiconductor devices.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: determining two or more parameters associated with designing a semiconductor device; determining a process window associated with acceptable limits of the two or more parameters; and applying a probability density function to the process window to generate a yield metric that relates the two or more parameters to yield.

Aspects of the present disclosure include optimizing the two or more parameters to generate two or more optimal parameters; and applying the probability density function based on the two or more optimal parameters. Another aspect includes applying the probability density function according to uncorrelated normal distributions for the two or more parameters. Yet another aspect includes applying the probability density function according to at least one of correlated distributions and spatially varying distributions for the two or more parameters. Additional aspects include determining two or more layers associated with designing the semiconductor device; and correlating distributions of the two or more parameters between the two or more layers. An additional aspect includes evaluating the yield metric with respect to at least one of an optical proximity correction (OPC) model and a source mask optimization (SMO) model. Another aspect includes maximizing a value associated with the yield metric with respect to the at least one of the OPC model and the SMO model. A further aspect includes the two or more parameters being exposure focus and exposure dosage. Yet another aspect includes the probability density function being a Gaussian probability density function.

Another aspect of the present disclosure is a device including: at least one processor; and at least one memory including computer program code for one or more programs, the at least one memory and the computer program code configured to, with the at least one processor, cause the apparatus to perform at least the following, determine two or more parameters associated with designing a semiconductor device; determine a process window associated with acceptable limits of the two or more parameters; and apply a probability density function to the process window to generate a yield metric that relates the two or more parameters to yield.

Aspects include the apparatus being further caused to: optimize the two or more parameters to generate two or more optimal parameters; and apply the probability density function based on the two or more optimal parameters. Another aspect includes the apparatus being further caused to: apply the probability density function according to uncorrelated normal distributions for the two or more parameters. Yet another aspect includes the apparatus being further caused to: apply the probability density function according to at least one of correlated distributions and spatially varying distributions for the two or more parameters. Still further aspects include the apparatus being further caused to: determine two or more layers associated with designing the semiconductor device; and correlate distributions of the two or more parameters between the two or more layers. An additional aspect includes the apparatus being further caused to: evaluate the yield metric with respect to at least one of an OPC model and a SMO model. Another aspect includes the apparatus being further caused to: maximize a value associated with the yield metric with respect to the at least one of the OPC model and the SMO model. Yet another aspect includes the two or more parameters being exposure focus and exposure dosage. Still another aspect includes the probability density function being a Gaussian probability density function.

Another aspect of the present disclosure is a method including: determining one or more layers associated with designing the semiconductor device; determining two or more parameters, including exposure dosage and exposure focus, associated with designing a semiconductor device, wherein one or more of the parameters are associated with one or more of the layers; determining one or more process windows associated with acceptable limits of the two or more parameters; and applying a Gaussian probability density function according to the one or more process windows to generate a yield metric that relates the two or more parameters to yield. Further aspects include evaluating the yield metric with respect to at least one of an OPC model and a SMO model; and maximizing a value associated with the yield metric with respect to the at least one of the OPC model and the SMO model to maximize a cost function.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

A process window (PW) is the area in the space of the process parameters corresponding to the values of these parameters yielding a process result satisfying certain success criteria. For example, a PW may be composed of the exposure dose and exposure focus pairs (e.g., E and F, respectively) that will result in the dimensions (e.g., line widths) of certain features being within 10 percent (e.g., +/−10%) of their target values. Another example of a practically useful process window is a PW of (E, F) pairs that result in no bridging occurring between the exposed features or spaces between them.

Figure 1:
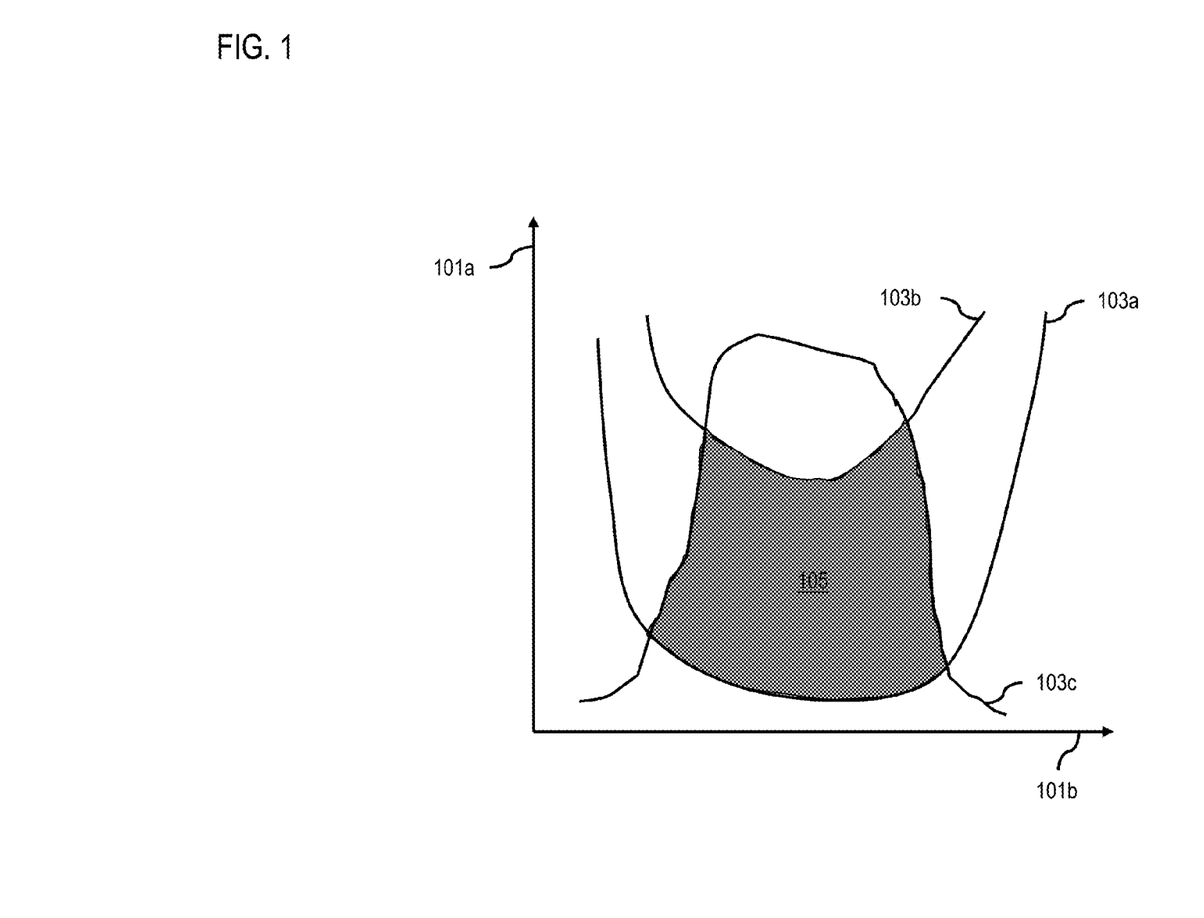
FIG. 1 illustrates a process window for two lithography process parameters, according to an exemplary embodiment.

FIG. 1 illustrates a typical PW 105 in a plane defined by exposure dose 101a along the vertical axis and exposure focus 101b along the horizontal axis. Curves 103a and 103b correspond to the exposure conditions (E, F) resulting in the width of the exposed features deviating +10% and −10%, respectively, off their target values. The area between the curves 103a and 103b corresponds to the exposure conditions where the width of the exposed features is within +/−10% of their target values. Furthermore, the area between curve 103c and the horizontal axis corresponds to the exposure conditions that would result in an acceptable level of the resist loss during the development process, following the exposure. The intersection of these two areas is the PW 105 with the exposure conditions (E, F) resulting in the widths of the exposed features varying within +/−10% of their target values and the acceptable resist loss during the development step of the process.

Although the above example shows a PW in the plane of exposure dose and exposure focus only, any number of these and other process parameters can be used to compute PWs of higher dimensions, such as mask bias parameters in addition to exposure dose and exposure focus to result in a three-dimensional process window.

Further, lithography processes usually have random variations of associated parameters—such as exposure dose and exposure focus randomly varying around their nominal values because of, for example, imperfections in the illuminator or imperfections of the wafer stage, respectively. The random variations of exposure dose and exposure focus can be described by uncorrelated normal distributions for both quantities, with the Equation 1 representing the probability density function for this distribution:

$$f_{E_0, F_0, \sigma_E, \sigma_F}(E, F) = \frac{1}{2\pi \sigma_E \sigma_F} \exp\left(-\frac{(E - E_0)^2}{2\sigma_E^2}\right) \exp\left(-\frac{(F - F_0)^2}{2\sigma_F^2}\right) \quad (1)$$

where $E_0$ and $F_0$ are the nominal (e.g., intended/target) values of the exposure dose and exposure focus, and $\sigma_E$ and $\sigma_F$ are the standard deviations of these two parameters, respectively. The error distribution can be based on a Gaussian distribution.

While Equation 1 provides acceptable distribution in general, lithography process errors may alternatively be characterized by random distributions other than normal or uniform distributions. The correlation between the errors of different natures may be present. Furthermore, the error distribution may vary depending on the spatial location on the wafer, and correlations between the errors at the neighboring spatial locations may be present.

Further, the errors may be in more than just two parameters (e.g., exposure dose, exposure focus and a mask bias). For cases with more than two parameters, Equation 1 can be written more generally. If the process is characterized by, for example, k parameters $x = [x_1, x_2, \ldots, x_k]$, one can write the generic probability density function simply as f(x) or $f(x_1, x_2, \ldots, x_k)$, subject to the normalization requirement $\int f(x) \, dx = 1$. In particular, for the same k process parameters, if the distributions of process parameters x are assumed to be normal with respective mean (e.g., target or nominal) values of $\mu = [\mu_1, \mu_2, \ldots, \mu_k]$ and the symmetric and positive definite k-by-k covariance matrix $\Sigma$, Equation 1 can be generalized as:

$$f(x_1, \ldots, x_k) = \frac{1}{(2\pi)^{k/2} |\Sigma|^{1/2}} \exp\left(-\frac{1}{2}(x - \mu)^T \Sigma^{-1}(x - \mu)\right) \quad (1')$$

where $|\Sigma|$ is the determinant of $\Sigma$.

Conventionally, for processes with normally distributed exposure dose and exposure focus errors, the metrics of the PW are calculated based on a procedure of inscribing a "3 sigma" ellipse into the PW. Under this approach, a maximal allowable depth of focus (DOF) assuming a given value of exposure latitude (EL) can be calculated for various values of EL. However, as discussed above, such a metric is not directly related to yield. Further, such metrics are computationally demanding, generally require iterations, and may result in multiple candidate solutions for complex-shaped PWs. As more dimensions are added, this conventional procedure is even more computationally demanding.

The present disclosure addresses and solves current problems of an inability to directly relate process parameters to yield and complex calculations, iterations, and multiple solutions attendant upon conventional processes involving inscribing a "3 sigma" ellipse in a PW. In accordance with embodiments of the present disclosure, a method and apparatus are described for generating metrics that directly relate two or more process parameters to yield.

Methodology in accordance with an embodiment of the present disclosure includes determining two or more parameters associated with designing or manufacturing a semiconductor device, such as exposure dose and exposure focus. Next, a PW is determined associated with acceptable limits of the two or more parameters. Then, a probability density function is applied to the PW to generate a yield metric that relates the two or more parameters to yield. Such a metric allows for selecting best possible lithography results directly related to yield rather than basing such decisions on other metrics that only directly relate to yield.

Figure 2:
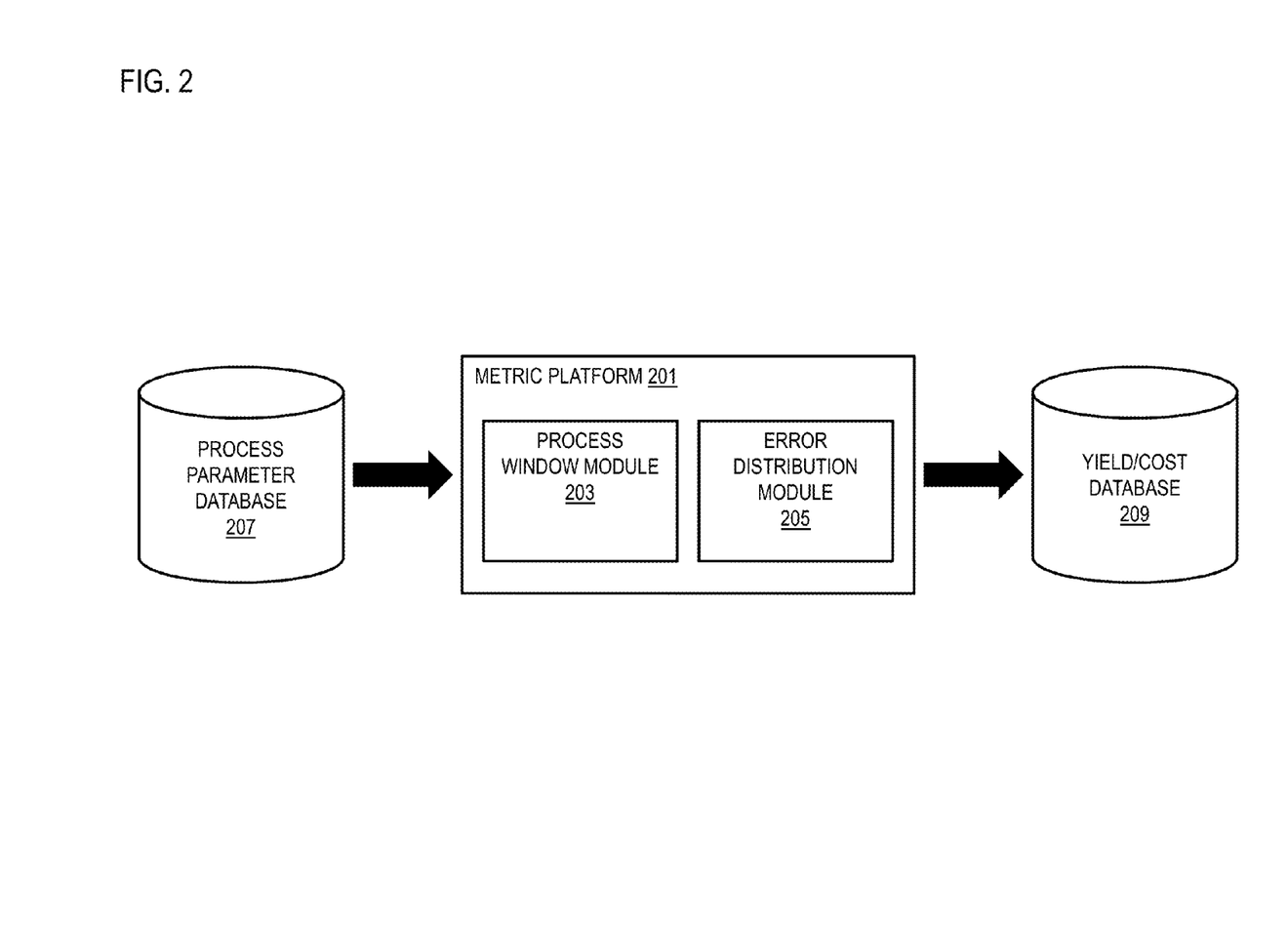
FIG. 2 schematically illustrates an overall system for generating and evaluating one or more metrics for analyzing the design and manufacture of semiconductor devices, according to an exemplary embodiment.

FIG. 2 illustrates a metric platform 201 that may generate and evaluate one or more metrics for analyzing the design and manufacture of semiconductor devices, in accordance with an exemplary embodiment. The metric platform 201 may be connected to or in communication with a process parameter database 207. The process parameter database 207 may be any type of database that includes information pertaining to parameters associated with the design and manufacture of semiconductor devices. Such parameters may include, for example, exposure dose and exposure focus for a lithography layer used in manufacturing a semiconductor device, as well as other parameters discussed herein. Although illustrated and described as a database, the process parameter database 207 may instead be any element that provides information to the metric platform 201 with respect to parameters used in the manufacture of semiconductor devices.

The metric platform 201 may further be connected to or in communication with a yield/cost database 209. The metric platform 201 may provide one or more outputs to the yield/cost database 209, such as one or more metrics used to evaluate the design and/or manufacture of a semiconductor device, such as a lithography step associated with the manufacture of a semiconductor device. The metric platform 201 may further output yields, such as optimized yields, based on a PW defined by two or more parameters evaluated based on the one or more generated metrics, as well as yield-to-cost analysis with respect to maximizing the yield while minimizing cost. Although the yield/cost database 209 is illustrated and described with respect to constituting a database, the metric platform 201 may provide the metrics or other outputs to any element or system that requests such information.

The metric platform 201 may include a process window module 203. The process window module 203 may determine PWs for two or more parameters that are being evaluated with respect yield and/or cost. As described above with respect to FIG. 1, the process window module 203 may determine the PW 105 with respect to two or more parameters, such as exposure dose and exposure focus of FIG. 1. The process window module 203 may then provide this information to the metric platform 201 for use in determining the metrics and other evaluations with respect to the two or more parameters. Alternatively, the metric platform 201 may not include a process window module 203 and, instead, may receive information regarding PWs from an external source, such as the process parameter database 207.

The metric platform 201 may also include an error distribution module 205 that may determine the error distributions with respect to the two or more parameters. The error distribution module 205 may determine the error distributions based on information from the process parameter database 207, such as error distribution information that is associated with the inputted process parameters, or may determine error distribution information from one or more other inputs, such as a technician or operator selecting one or more error distributions. As discussed, the error distributions may be normal distributions, distributions other than normal, correlated distributions, random errors with spatially varying distributions, random errors with correlations between neighboring spatial positions, or error distributions accounting for lithographic processes for more than a single layer (e.g., for an assemblage of multiple layers for an integrated circuit).

The metric platform 201 generates and evaluates one or more metrics for analyzing the design and manufacture of semiconductor devices. Using notations and definitions introduced above, and applying Equation 1 to generate an estimated yield metric for a process with a PW, targeted exposure dose $E_0$, targeted focus $F_0$, and standard deviations of the exposure dose and exposure focus variations of $\sigma_E$ and $\sigma_F$, respectively, the metric platform 201 can generate a metric according to Equation 2:

$$Y(W, E_0, F_0, \sigma_E, \sigma_F) = \int\int_W f_{E_0, F_0, \sigma_E, \sigma_F}(E, F) dE dF \quad (2)$$

where f(E,F) is Equation 1 above of the random dose and exposure errors. Thus, the estimated yield is the probability that the result of the process will be within specification by satisfying the process success criteria, as defined by the PW. This probability is the estimate of the yield of a lithographic process for a specific layer associated with the exposure dose and exposure focus parameters.

Further, Equation 2 can be generalized. For any k number of parameters x, distributed with a probability density function $f_{\mu,\Sigma}(x)$, where $\mu$ are the mean (e.g., nominal or target) values of the parameters and $\Sigma$ is a set of other parameters of this distribution (not necessarily a covariance matrix), Equation 2 becomes:

$$Y(W, \mu, \Sigma) = \int_W f_{\mu,\Sigma}(x) dx \quad (2')$$

Thus, Equation 2' can be used for determining a yield metric for more than two parameters.

For many lithographic processes, the targeted exposure dose $E_0$ and exposure focus $F_0$ are usually optimized and set to their optimal values, such as optimal exposure dose and optimal exposure focus. Accordingly, a best estimated yield metric can be determined according to:

$$Y_{max}(W, \sigma_E, \sigma_F) = \max_{E_0, F_0} Y(W, E_0, F_0, \sigma_E, \sigma_F) \quad (3)$$

This best estimated yield is the highest possible estimated yield achievable for a process with a given PW defined by the selected parameters and standard deviations, represented in this case by $\sigma_E$ and $\sigma_F$.

Further, Equation 3 can be generalized. For any k number of parameters x, distributed with a probability density function $f_{\mu,\Sigma}(x)$, where $\mu$ are the mean (e.g., nominal or target) values of the parameters and $\Sigma$ is a set of other parameters of this distribution (not necessarily a covariance matrix), Equation 3 becomes:

$$Y_{max}(W, \Sigma) = \max_{\mu} Y(W, \mu, \Sigma) \quad (3')$$

As discussed for Equation 2', Equation 3' can be used for determining a best yield metric for more than two parameters.

Equations 2 and 3 are examples of PW metrics that do not require inscribing an ellipse into the PW. Computations using one or more of the above two equations are straightforward. For Equation 2, one needs to use one of the well-known numerical integration formulae to evaluate the integral. For Equation 3, one needs to numerically compute the convolution of Equation 1 with the function equal to 1 everywhere inside the PW and equal to 0 everywhere outside the PW. The value of the convolution at point $(E_0, F_0)$ is equal to the value of Equation 1 with the target exposure dose and exposure focus equal to $(E_0, F_0)$. Further, the maximum value attained by this convolution of the (E, F) plane gives the value of Equation 2.

As described above, although Equations 1 through 3 are provided for two-dimensional PWs within the exposure dose and exposure focus plane with the assumption of normally distributed process errors, Equations 1 through 3 can be generalized for more generic and/or higher dimensions. For example, PWs may include a larger number of process parameters than two, error distributions may be other than normal distributions, the errors may be correlated, random errors may vary with spatially varying distributions, random errors may have correlations between neighboring spatial positions, and lithographic processes for more than a single layer may be correlated.

Further, for a case considering more than just a single layer, each layer is fabricated with its own process and has its own errors with their own probability density functions. When the results of two or more layer processes are combined, the correlations between the process errors can be accounted for. For example, residual wafer non-planarity, such as after chemical mechanical polishing (CMP), may result in correlated exposure focus errors for layers. The errors of the combined process will generally be distributed according to a probability density function taking into account possible correlations between different layers. By way of another example, the success criteria for a fabrication process involving multiple layers can take into account mutual alignment of features on different layers, such as vertical interconnect accesses (VIAs) on a VIA layer being positioned properly to provide sufficient overlap with the features on another layer, to which these VIAs need to be connected. As a result, a PW for a combined multi-layer fabrication process can be defined by these mutual alignment requirements, in addition to other requirements for the sizes of the printed features to be within a certain specification of their target values. Taking these two examples into account, generalization of Equations 2 and 3 for the multi-layer combined process can be accomplished using the probability density functions with a larger number of parameters and a possible correlation between parameter errors, as discussed above.

With respect to random errors with spatially varying distributions, or random errors with correlations between the neighboring spatial positions, one way to generalize Equations 2 and 3 to these situations is to divide the exposure area into non-overlapping areas (e.g., cells) that are small enough to neglect the variation of the error distributions within each cell. These non-overlapping areas may be formed by a regular square grid with small enough grid cells such that each of these cells will have its own process parameter errors, and the process parameter errors for the whole layer will be composed out of the process parameter errors for these cells. The probability density function for these errors will be a probability density function depending on parameter errors in all cells. If correlations between neighboring positions are present, this probability density function will be reflecting these correlations. Calculation of Equations 2 and 3 then can be done in the same way as described suggested above for the case of a large number parameters, distributions other than normal and a presence of correlations.

Still further, using the methodology presented above also allows for using currently used PW metrics without having to inscribe ellipses within the PW. As discussed above, one commonly used metric is DOF for a given EL. A conventional way of calculating this metric is by considering all ellipses with an exposure dose semi-axis equal to the EL value and finding the maximum possible exposure focus semi-axis that would allow such an ellipse to be inscribed in the PW. The value of the maximum exposure focus semi-axis is the DOF corresponding to the given EL value. Such a procedure is justified by interpreting the values of EL and DOF as "3 sigma" values for the exposure dose and the exposure focus errors (e.g., three times their standard deviations). For normally distributed random errors (e.g., Equation 1), the probability that the exposure dose and exposure focus will be within the ellipse with semi-axes equal to an EL of $3\sigma_E$ and to a DOF of $3\sigma_F$ is 99.73%. Therefore, if the exposure with the standard deviations of errors given by $\sigma_E$=EL/3 and $\sigma_F$=DOF/3 is used, the best estimated layer yield will be close to 99.73%.

The above procedure based on finding a maximum ellipse that can be inscribed into the PW is approximate. Such a procedure neglects exposures that can happen outside the 3 sigma ellipse but still fall inside the PW. Accordingly, the following procedure can calculate the same DOF for a given EL exactly and in a more computationally efficient way by using the above methodology.

Given an EL of 5%, the best estimated layer yield $Y_{max}^{(0)}$ of 0.9973, and the PW, a maximal DOF can be found ensuring the best estimated layer yield according to the following. Initially, the standard deviation $\sigma_E$ of the exposure dose variation from the given EL is determined. If the EL and DOF are both 3 sigma values, then $\sigma_E^{(0)}$=EL/3. Further, for the given PW and the determined value of $\sigma_E^{(0)}$, Equation 3 becomes a function of only $\sigma_F$. Then, the value of the exposure focus standard deviation $\sigma_F$ resulting in the highest possible best estimated layer yield is determined according to Equation 4.

$$\sigma_F^{(0)} = \arg\max_{\sigma_F} Y_{max}(W, \sigma_E^{(0)}, \sigma_F) \quad (4)$$

The value of $Y_{max}(W, \sigma_E^{(0)}, \sigma_F)$ of Equation 4 is evaluated and compared to the given value of $Y_{max}^{(0)}$ of 0.9973. If $Y_{max}(W, \sigma_E^{(0)}, \sigma_F) \geq Y_{max}^{(0)}$, the exposure with the best estimated layer yield of at least $Y_{max}^{(0)}$ is possible, and the highest standard deviation of exposure focus ensuring such an exposure is $\sigma_F^{(0)}$. If $Y_{max}(W, \sigma_E^{(0)}, \sigma_F) < Y_{max}^{(0)}$, the exposure with the best estimated layer yield of $Y_{max}^{(0)}$ is not possible with the given value of EL. Compared to the conventional way of determined DOF at the given EL by inscribing ellipses into a PW, described above, the latter corresponds to a situation when no ellipse of the given dose semi-axis EL can be inscribed into a PW.

If an exposure ensuring the best estimated layer yield of at least $Y_{max}^{(0)}$ is possible and the exposure focus standard deviation $\sigma_F^{(0)}$ has been determined with respect to the previous step, the exposure focus standard deviation $\sigma_F^{(0)}$ is then used to calculate the DOF, such as calculating DOF as equal to $3\sigma_F^{(0)}$, where DOF corresponds to a 3 sigma value of the exposure focus variation.

Computational evaluation of $\sigma_F^{(0)}$ using Equation 4 involves evaluating $Y_{max}(W,\sigma_E^{(0)},\sigma_F)$ for a set of values of $\sigma_F$, spanning a certain range and then selecting $\sigma_F$ corresponding to the maximum value of evaluated $Y_{max}(W,\sigma_E^{(0)},\sigma_F)$. Each evaluation of $Y_{max}(W,\sigma_E^{(0)},\sigma_F)$ involves calculating a convolution of Equation 1 with the PW and determining the maximum value of the convolution. These computational procedures are straightforward, deterministic and non-iterative, unlike the conventional procedure of inscribing a maximum ellipse into a PW.

Equations 2 and 3 also can be used as cost functions associated with modeling the results of the lithography process for the selected process parameters needed to characterize the PW. Equation 2 can be evaluated for the given target exposure dose $E_0$ and exposure focus $F_0$ and also given standard deviations of the exposure dose errors $\sigma_E$ and exposure focus errors $\sigma_F$, a cost function can be set equal to Equation 2, and models representing the OPC or SMO valuations can be run so that the value of the cost function is maximized. Similarly, OPC or SMO problems can be solved by maximizing the best estimated yield metric according to Equation 3.

To evaluate the PW metrics for a given source and mask combination during the OPC or SMO iterations, (i) the PW in the space of the selected process parameters (e.g., exposure dose and exposure focus) for the given source and mask on the current iteration can be determined, and (ii) a numerical calculation of the integrals is performed. Step (i) involves applying the OPC/SMO model for multiple combinations of the process conditions in order to determine the PW. For most process parameters, application of the OPC/SMO model for each combination of parameters involves the same time as it takes to apply this OPC/SMO model once (e.g., each time all calculations need to be performed with a new set of parameters from the very beginning).

For the case of a PW in exposure dose and exposure focus space (e.g., two parameters only), finding the PW on each OPC/SMO iteration involves applying the OPC/SMO model at multiple locations. To sample the shape of the PW, one can estimate that one will need $N_d$ steps in exposure dose and $N_f$ steps in exposure focus. This amounts to evaluation of the OPC/SMO model for $N_d*N_f$ process conditions (e.g., $N_d=N_f=10$). For a simple resist model (or no resist models) the exposure dose/exposure focus pair differing only in a exposure dose value will involve a single application of the OPC/SMO model and then re-scaling its result for each dose value. Overall, determining the PW involves applying the OPC/SMO model $N_f$ times.

Figure 3:
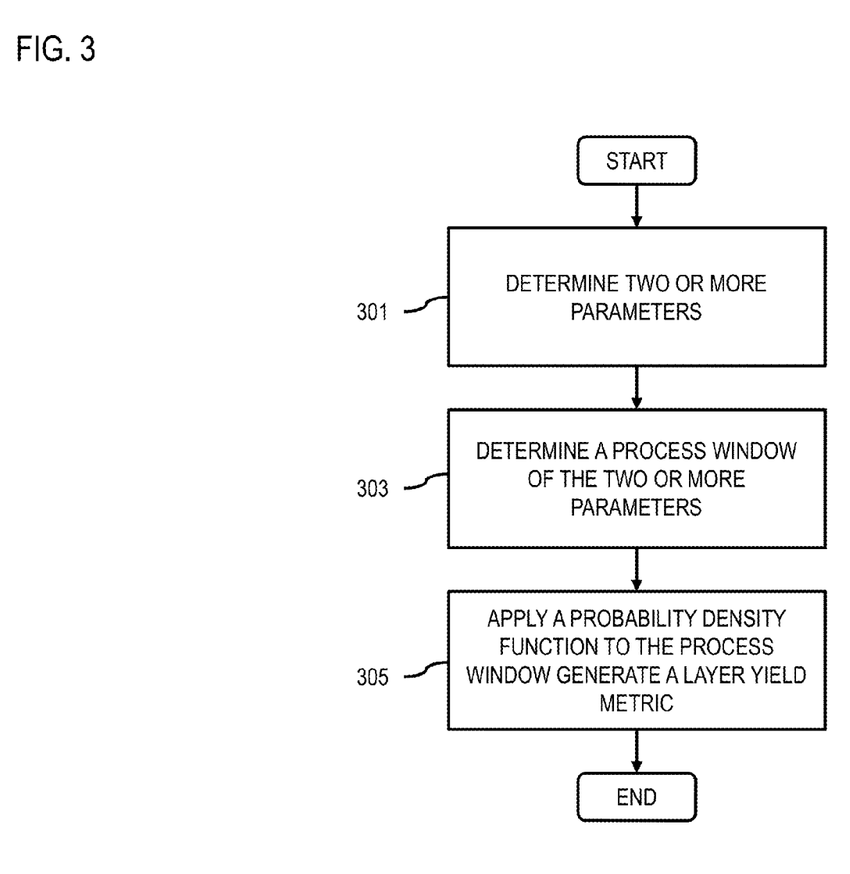
FIG. 3 is a flowchart of a process for generating and evaluating one or more metrics for analyzing the design and manufacture of semiconductor devices, according to an exemplary embodiment.
Figure 6:
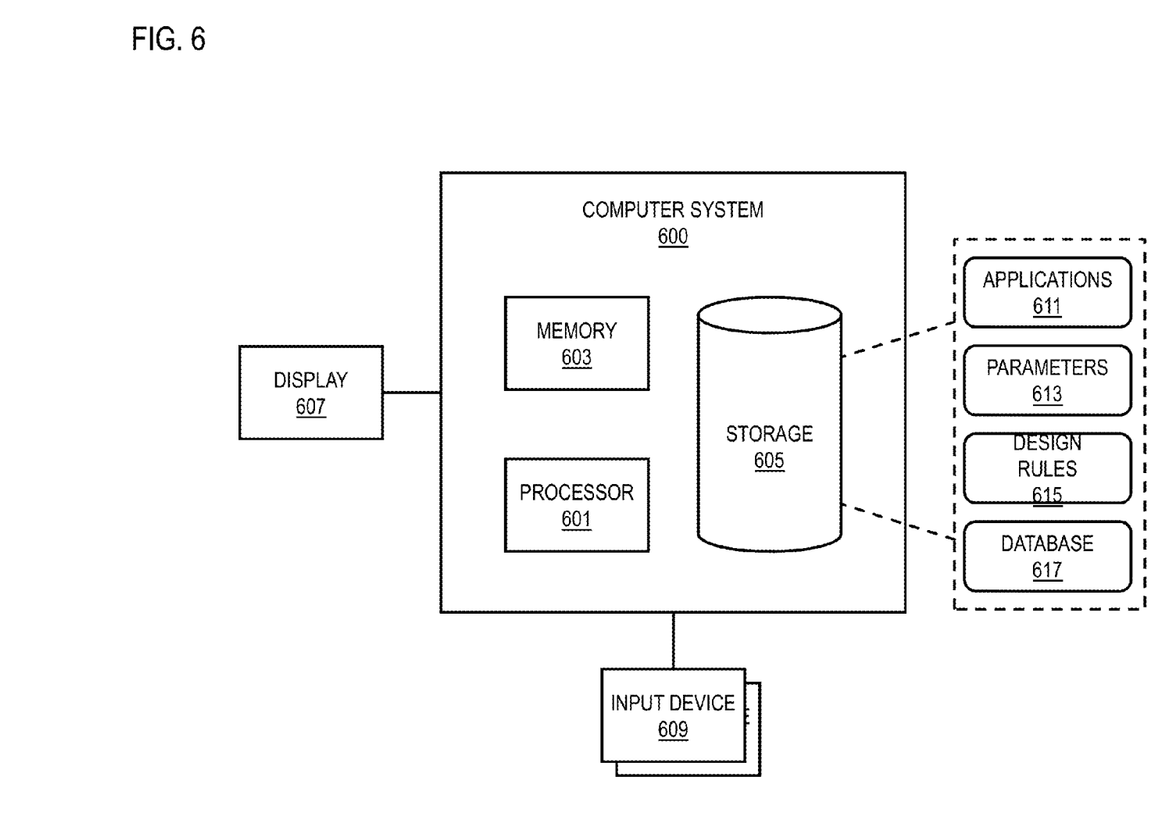
FIG. 6 schematically illustrates a computer system for implementing the processes of FIGS. 3 through 5, according to an exemplary embodiment.

Adverting to FIG. 3, FIG. 3 is a flowchart of a process for generating and evaluating one or more metrics for analyzing the design and manufacture of semiconductor devices, according to an exemplary embodiment. For the process of FIG. 3, the metric platform 201 performs the process and is implemented in, for instance, a chip set including a processor and a memory as shown in FIG. 6.

At step 301, the metric platform 201 determines two or more parameters associated with designing a semiconductor device. The parameters may be associated with the design and/or manufacture of a semiconductor device, such as, for example, exposure dose; exposure focus; mask bias; wafer film thickness, stack film thickness, and spin speeds to deposit such films; optical constants of the materials used in the wafer film stack; mask film stack thicknesses; optical constants of the mask film stack materials (e.g., molybdenum-silicon alloy (MoSi)); exposure wavelength; as well as other parameters. The determination of the two or more parameters may be based on an automatic selection by the metric platform 201 according to the parameters that are input to the metric platform 201. The determination alternatively may be based on a manual selection of the two or more parameters, such as by an operator or technician using the metric platform 201.

Upon determining the two or more parameters, at step 303, the metric platform 201 determines a PW associated with acceptable limits of the two or more parameters. Such as determination may based on the acceptable limits being provided to the metric platform 201, or the acceptable limits may be determined by the metric platform 201 based on one or more analyses associated with the parameters. As discussed above, as an example, a PW may be based on acceptable limits of exposure conditions where the width of the exposed features is within +/−10% of their target values, as well as exposure conditions that would result in an acceptable level of the resist loss during the development process, following the exposure. The intersection of these two areas constitutes the PW.

At step 305, the metric platform 201 applies a probability density function to the PW to generate a yield metric that relates the two or more parameters to the yield. The probability density function may be based on a Gaussian probability density function. According to the above disclosure, the probability density function can be applied to the PW according to uncorrelated normal distributions of errors for the two or more parameters, may be applied according to correlated distributions and spatially varying distributions for the two or more parameters, or may be applied according to any other distributions as discussed above. One example of the disclosed yield metric is described above with respect to Equation 2. The process disclosed with respect to FIG. 3 may be further modified by correlating distributions between the two or more parameters across two or more layers associated with the design and manufacture of a semiconductor device. Upon determining the yield metric, the metric can be used to relate the two or more parameters to the yield with respect to the design and/or manufacture of a semiconductor device.

Figure 4:
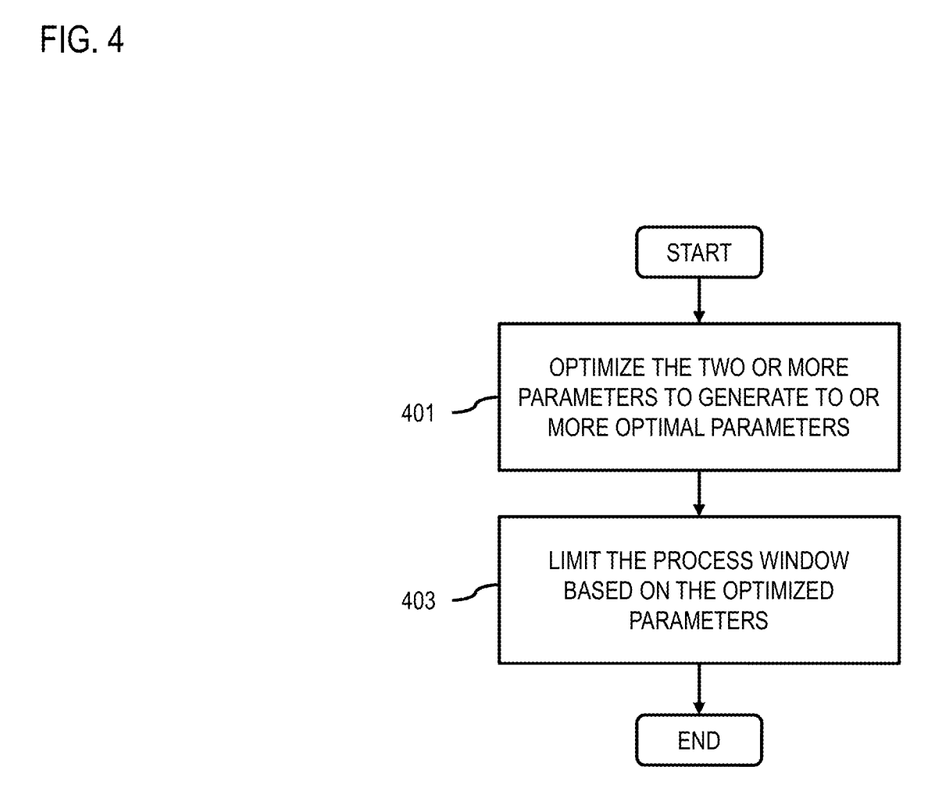
FIG. 4 is a flowchart of a process for generating a best yield metric, according to an exemplary embodiment.

Adverting to FIG. 4, FIG. 4 is a flowchart of a process for generating a best yield metric, according to an exemplary embodiment. For the process of FIG. 4, the metric platform 201 performs the process and is implemented in, for instance, a chip set including a processor and a memory as shown in FIG. 6.

In step 401, the metric platform 201 optimizes the two or more parameters to generate two or more optimal parameters. The optimization may be to obtain the optimal values of the two or more parameters. For the case of exposure dose and exposure focus, the optimization may generate the optimal exposure dose and the optimal exposure focus. The optimization may be based on one or more models for optimizing the parameters. Alternatively, the metric platform 201 may receive the optimal parameters, such as receiving the optimal parameters from the process parameter database 207.

At step 403, the metric platform 201 applies the probability density function based on the two or more optimal parameters. For example, the targeted exposure dose $E_0$ and exposure focus $F_0$ may be optimized and set to their optimal values, such as optimal exposure dose and optimal exposure focus. Subsequently, this best estimated layer yield is the highest possible estimated layer yield achievable for a process with a given PW defined by the selected optimal parameters. One example of the resulting best yield metric is disclosed above with respect to Equation 3.

Figure 5:
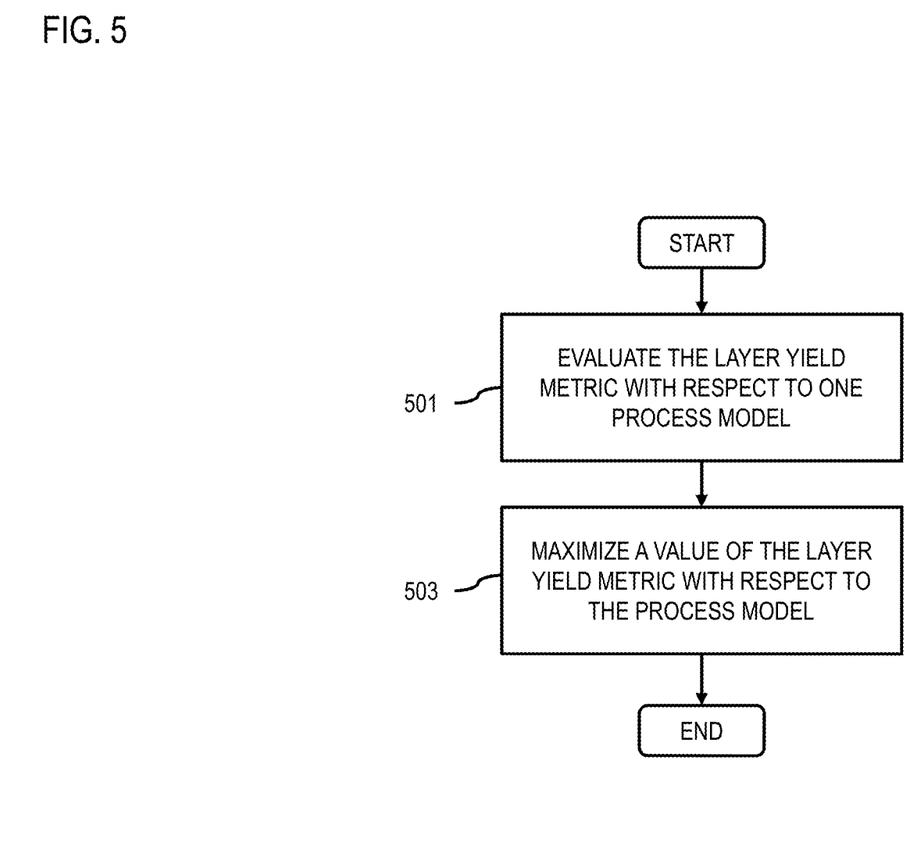
FIG. 5 is a flowchart of a process for applying a yield metric as a cost function, according to an exemplary embodiment.

Adverting to FIG. 5, FIG. 5 is a flowchart of a process for applying a yield metric as a cost function, according to an exemplary embodiment. For the process of FIG. 5, the metric platform 201 performs the process and is implemented in, for instance, a chip set including a processor and a memory as shown in FIG. 6.

In step 501, the metric platform 501 may evaluate a yield metric with respect to a process model, such as associated with evaluating correction and/or optimization of the design and/or manufacture of the semiconductor device. Examples of such a process model may be models associated with OPC and SMO. A model that evaluates the results of a lithography process for the two or more parameters can be further evaluated with respect to the yield metric.

In step 503, a value associated with the yield metric may maximized with respect to the process model to generate a cost function associated with yield. Maximizing the yield while minimizing the cost function allows for the generation of the best yield at the lowest cost. For example, the yield metric can be evaluated for a given target of exposure dose and exposure focus, and also standard deviations of the exposure dose and exposure focus errors. A cost function can then be set equal to the metric and an OPC or SMO model can be run so that the value of the cost function is maximized. According to this process, the layer yield can be maximized directly instead of relying on optimizing, for example, a weighted sum of squares of edge placement errors evaluated at several process conditions and hoping that such an optimization will also help to increase yield.

The processes of FIGS. 3 through 5 described herein may be implemented via software, hardware, firmware, or a combination thereof. Exemplary hardware (e.g., computing hardware) is schematically illustrated in FIG. 6. As shown, computer system 600 includes at least one processor 601, at least one memory 603, and at least one storage 605. Computer system 600 may be coupled to display 607 and one or more input devices 609, such as a keyboard and a pointing device. Display 607 may be utilized to provide one or more GUI interfaces. Input devices 609 may be utilized by users of computer system 600 to interact with, for instance, the GUI interfaces. Storage 605 may store applications 611, layout data (or information) or parameters 613, design plus rules 615, and at least one shape database (or repository) 617. Applications 611 may include instructions (or computer program code) that when executed by processor 601 cause computer system 600 to perform one or more processes, such as one or more of the processes described herein. In exemplary embodiments, applications 611 may include one or more manufacturability analysis and/or yield enhancement tools.

The embodiments of the present disclosure achieve several technical effects, including using the above-discussed metrics to select the best OPC or SMO results rather than basing such decisions on other metrics that do not directly relate to yield, evaluating PW metrics in a computationally efficient and non-iterative and deterministic way that are better suited for OPC and SMO models, and using OPC or SMO cost functions based on Equations 2 or 3 to directly maximize yield. The present disclosure enjoys industrial applicability associated with the designing and manufacturing of any of various types of highly integrated semiconductor devices used in microprocessors, smart phones, mobile phones, cellular handsets, set-top boxes, DVD recorders and players, automotive navigation, printers and peripherals, networking and telecom equipment, gaming systems, and digital cameras.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
   determining two or more parameters associated with designing a semiconductor device;
   determining two or more layers associated with designing the semiconductor device;
   determining a process window associated with acceptable limits of the two or more parameters;
   correlating distributions of the two or more parameters between the two or more layers; and
   applying, by a processor, a probability density function and the correlated distribution of the two or more parameters to the process window to generate a yield metric that relates the two or more parameters to yield.

2. The method according to claim 1, further comprising:
   optimizing the two or more parameters to generate two or more optimal parameters; and
   applying the probability density function based on the two or more optimal parameters.

3. The method according to claim 1, comprising:
   applying the probability density function according to uncorrelated normal distributions for the two or more parameters.

4. The method according to claim 1, comprising:
   applying the probability density function according to at least one of correlated distributions and spatially varying distributions for the two or more parameters.

5. The method according to claim 1, further comprising:
   evaluating the yield metric with respect to at least one of an optical proximity correction (OPC) model and a source mask optimization (SMO) model.

6. The method according to claim 5, further comprising:
   maximizing a value associated with the yield metric with respect to the at least one of the OPC model and the SMO model.

7. The method according to claim 1, wherein the two or more parameters are exposure focus and exposure dosage.

8. The method according to claim 1, wherein the probability density function is a Gaussian probability density function.

9. An apparatus comprising:
   at least one processor; and
   at least one memory including computer program code for one or more programs, the at least one memory and the computer program code configured to, with the at least one processor, cause the apparatus to perform at least the following, determine two or more parameters associated with designing a semiconductor device;

determine two or more layers associated with designing the semiconductor device;

determine a process window associated with acceptable limits of the two or more parameters;

correlate distributions of the two or more parameters between the two or more layers; and apply a probability density function and the correlated distribution of the two or more parameters to the process window to generate a yield metric that relates the two or more parameters to yield.

10. The apparatus according to claim 9, wherein the apparatus is further caused to:

optimize the two or more parameters to generate two or more optimal parameters; and apply the probability density function based on the two or more optimal parameters.

11. The apparatus according to claim 9, wherein the apparatus is further caused to:

apply the probability density function according to uncorrelated normal distributions for the two or more parameters.

12. The apparatus according to claim 9, wherein the apparatus is further caused to:

apply the probability density function according to at least one of correlated distributions and spatially varying distributions for the two or more parameters.

13. The apparatus according to claim 9, wherein the apparatus is further caused to:

evaluate the yield metric with respect to at least one of an optical proximity correction (OPC) model and a source mask optimization (SMO) model.

14. The apparatus according to claim 13, wherein the apparatus is further caused to:

maximize a value associated with the yield metric with respect to the at least one of the OPC model and the SMO model.

15. The apparatus according to claim 9, wherein the two or more parameters are exposure focus and exposure dosage.

16. The apparatus according to claim 9, wherein the probability density function is a Gaussian probability density function.

17. A method comprising:

determining two or more layers associated with designing a semiconductor device;

determining two or more parameters, including exposure dosage and exposure focus, associated with designing a semiconductor device, wherein one or more of the parameters are associated with one or more of the layers;

determining one or more process windows associated with acceptable limits of the two or more parameters;

correlating distributions of the two or more parameters between at least two of the two or more layers; and applying, by a processor, a Gaussian probability density function and the correlated distribution of the two or more parameters according to the one or more process windows to generate a yield metric that relates the two or more parameters to yield.

18. The method according to claim 17, further comprising:

evaluating the yield metric with respect to at least one of an optical proximity correction (OPC) model and a source mask optimization (SMO) model; and maximizing a value associated with the yield metric with respect to the at least one of the OPC model and the SMO model to maximize a cost function.

* * * * *